（12） United States Patent
Slack

(10) Patent No.: US 11,158,864 B2
(45) Date of Patent: Oct. 26, 2021

(54) ELECTRODE WITH STRUCTURED UNITS

(71) Applicant: Nikola Corporation, Phoenix, AZ (US)

(72) Inventor: John Slack, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 16/890,269

(22) Filed: Jun. 2, 2020

(65) Prior Publication Data
US 2020/0365909 A1 Nov. 19, 2020

Related U.S. Application Data

(63) Continuation of application No. PCT/US2020/030234, filed on Apr. 28, 2020.

(60) Provisional application No. 62/847,156, filed on May 13, 2019.

(51) Int. Cl.
H01M 4/88 (2006.01)
H01M 4/86 (2006.01)
H01M 4/92 (2006.01)
H01M 8/1018 (2016.01)

(52) U.S. Cl.
CPC ....... *H01M 4/8853* (2013.01); *H01M 4/8663* (2013.01); *H01M 4/881* (2013.01); *H01M 4/926* (2013.01); *H01M 2008/1095* (2013.01)

(58) Field of Classification Search
CPC .. H01M 4/8853; H01M 4/8663; H01M 4/881; H01M 4/926; H01M 2008/1095; H01M 4/886; H01M 4/8807; H01M 4/8814; H01M 4/9008; Y02E 60/50
See application file for complete search history.

(56) References Cited

U.S. PATENT DOCUMENTS

| 2009/0155658 | A1 | 6/2009 | Kotera et al. |
| 2011/0091790 | A1* | 4/2011 | Barnwell ............ H01M 8/1051 429/483 |
| 2014/0051013 | A1 | 2/2014 | Elabd et al. |
| 2016/0211540 | A1* | 7/2016 | Haug ..................... H01M 4/663 |
| 2018/0233758 | A1* | 8/2018 | Schmidt .............. H01M 4/8807 |
| 2019/0341639 | A1* | 11/2019 | Uchida .................... B05D 7/24 |

(Continued)

FOREIGN PATENT DOCUMENTS

| KR | 20160030719 A | * | 3/2016 | |
| WO | WO 2013/009275 | * | 1/2013 | ............. H01M 4/92 |

(Continued)

OTHER PUBLICATIONS

Machine translation of KR 20160030719A, Bae et al., 2016 (Year: 2016).*

(Continued)

*Primary Examiner* — Kwang Han
(74) *Attorney, Agent, or Firm* — Snell & Wilmer L.L.P.

(57) ABSTRACT

Improved catalyst layers for use in fuel cell membrane electrode assemblies, and methods for making such catalyst layers, are provided. Catalyst layers can comprise structured units of catalyst, catalyst support, and ionomer. The structured units can provide for more efficient electrical energy production and/or increased lifespan of fuel cells utilizing such membrane electrode assemblies. Catalyst layers can be directly deposited on exchange membranes, such as proton exchange membranes.

16 Claims, 10 Drawing Sheets

(56) References Cited

U.S. PATENT DOCUMENTS

2020/0083542 A1* 3/2020 Yushin ............... H01M 4/622

FOREIGN PATENT DOCUMENTS

WO    WO 2018/104775    *   6/2018
WO    WO 2018/135611    *   7/2018    ......... H01M 8/1004

OTHER PUBLICATIONS

PCT; Invitation to Pay Additional Fees in the PCT Application No. PCT/US20/30234 dated Jul. 9, 2020.
J.J. Slack, et al. "Nanofiber Fuel Cell MEAs with PtCo/C Cathode", Journal of The Electrochemical Society, 166(7), pp. F3202-/f3209 (2019).
PCT; International Search Report and Written Opinion dated Jul. 2, 2020 in Application No. PCT/US2020/030234.

* cited by examiner

ELECTRODE WITH STRUCTURED UNITS

CROSS-REFERENCE TO RELATED APPLICATIONS

This application is a continuation of PCT Application No. PCT/US20/30234 entitled "Catalyst Layers of Membrane-Electrode Assemblies and Methods of Making Same" filed on Apr. 28, 2020. PCT Application No. PCT/US20/30234 claims priority to and the benefit of U.S. Provisional Application No. 62/847,156 entitled "Catalyst Layers of Membrane-Electrode Assemblies and Methods of Making Same" filed on May 13, 2019. Each of the foregoing applications are hereby incorporated by reference in their entirety (except for any subject matter disclaimers or disavowals, and except to the extent of any conflict with the disclosure of the present application, in which case the disclosure of the present application shall control).

TECHNICAL FIELD

The disclosure relates generally to systems, methods, and devices for fuel cell components, and more particularly, to methods, systems, and devices for fuel cell membrane-electrode assemblies.

BACKGROUND

Current state-of-the-art catalyst layers in membrane-electrode assemblies (MEAs) used in fuel cells (such as proton exchange membrane fuel cells) are formed utilizing either slot-die coating or spray coating of an intermediate substrate (such as a decal substrate). These methods of deposition require solvent drying steps which cause uneven catalyst layer surfaces due to capillary forces originating from evaporation. These forces may directly cause cracks (desiccation structures) to form in the catalyst layer. However, even in catalyst layers without any directly-formed cracks, the thinnest portions of these surfaces provide nucleation sites for crack growth during normal operation of the fuel cell MEA. Once a crack is formed in the catalyst layer, the crack will propagate into the membrane, causing pin-holes and failure of the MEA.

Another shortcoming of current methods of forming catalyst layers is over-use of ionomer to obtain adequate ionic conductivity within the catalyst layer. Several deleterious effects are observed when excess ionomer is present, including binding of ionomer to catalyst sites. When ionomer is bound to catalyst surfaces, sulfonate-ion poisoning occurs, reducing oxygen reduction reaction kinetics, and the bound ionomer stiffens, increasing Knudsen-dominated gas transport effects. Another negative effect of excess ionomer is an overall increase in catalyst layer hydrophilicity, which dissolves metal catalyst and hastens degradation. In light of these and other shortcomings of current approaches, catalyst layers having reduced ionomer usage and crack formation and propagation during operation of the fuel cell are desirable.

SUMMARY

In an exemplary embodiment, a method of forming an electrode comprises providing a first reservoir containing a first dispersion. The first dispersion comprises a first ionomer, a catalyst powder containing carbon, and a first solvent. The method further comprises applying an electrical bias between a substrate and a first needle in fluid communication with the first reservoir; and pumping the first dispersion from the first reservoir through the first needle towards a first surface of the substrate to form a plurality of structured units on a surface of the substrate.

In another exemplary embodiment, an electrode, comprises at least one layer of structured units adhered to a surface of a substrate, each of the structured units comprising an outer shell and an inner core. The inner core has a first radius, the inner core comprises a plurality of catalyst particles coupled to a plurality of carbon-containing support particles and comprises an ionomer at a first concentration, the outer shell substantially surrounds the inner core from the first radius to a second radius greater than the first radius, the outer shell comprises the ionomer at a second concentration greater than the first concentration, and each of the structured units comprises an overall ratio of ionomer to carbon of between 0.5 and 2.

In another exemplary embodiment, a method of forming a membrane electrode assembly for a fuel cell comprises providing a catalyst layer comprising a substrate and a plurality of structured units adhered to a surface of the substrate, each of the structured units comprising an outer shell and an inner core. The inner core has a first radius, the inner core comprises a plurality of catalyst particles coupled to a plurality of carbon-containing support particles and comprises an ionomer at a first concentration, the outer shell substantially surrounds the inner core from the first radius to a second radius greater than the first radius, the outer shell comprises the ionomer at a second concentration greater than the first concentration, and each of the structured units comprises an overall ratio of ionomer to carbon of between 0.5 and 2. The method further comprises positioning the plurality of structured units of the catalyst layer proximate a surface of a membrane; heat pressing the catalyst layer and the membrane together; and removing the substrate of the catalyst layer.

The foregoing features and elements may be combined in any combination, without exclusivity, unless expressly indicated herein otherwise. These features and elements as well as the operation of the disclosed embodiments will become more apparent in light of the following description and accompanying drawings. The contents of this section are intended as a simplified introduction to the disclosure and are not intended to be used to limit the scope of any claim.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1A:
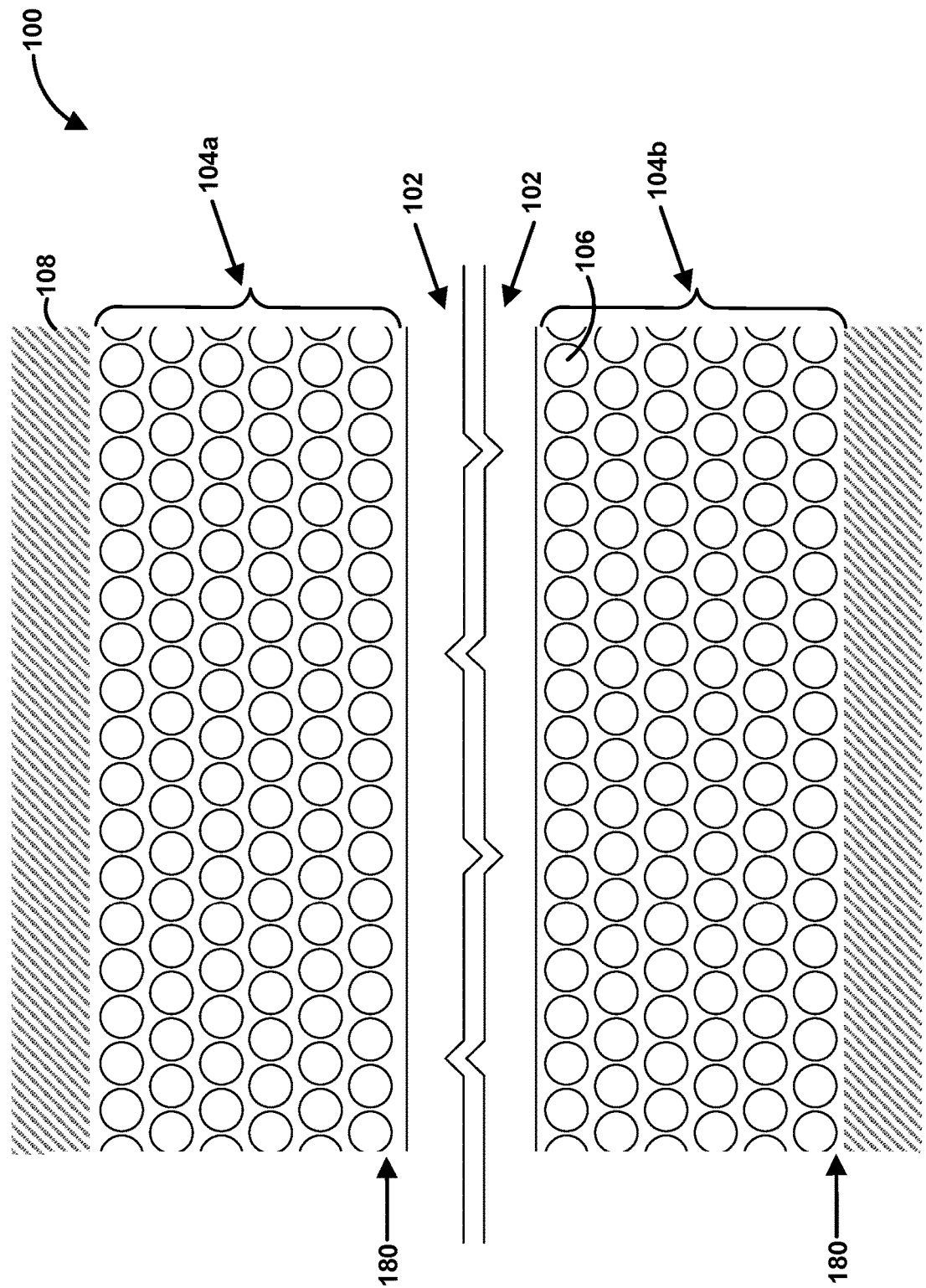
FIG. 1A is a cross-sectional view of an exemplary membrane-electrode assembly in accordance with various exemplary embodiments.

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary. It is also to be understood that the terminology employed herein is used for the purpose of describing particular embodiments only and is not intended to be limiting. In describing the disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

Via application of principles of the present disclosure, exemplary catalyst layers can increase the lifespan of a fuel cell by preventing catastrophic failure of the membrane. Further, exemplary catalyst layers provide sufficient space between spherical sub-structures to expand and contract which further protect against cracking due to normal operation. Additionally, exemplary catalyst layers provide more optimal utilization of catalyst material, potentially providing higher power at high voltage (i.e. high efficiency), and reducing waste heat.

Figure 1B:
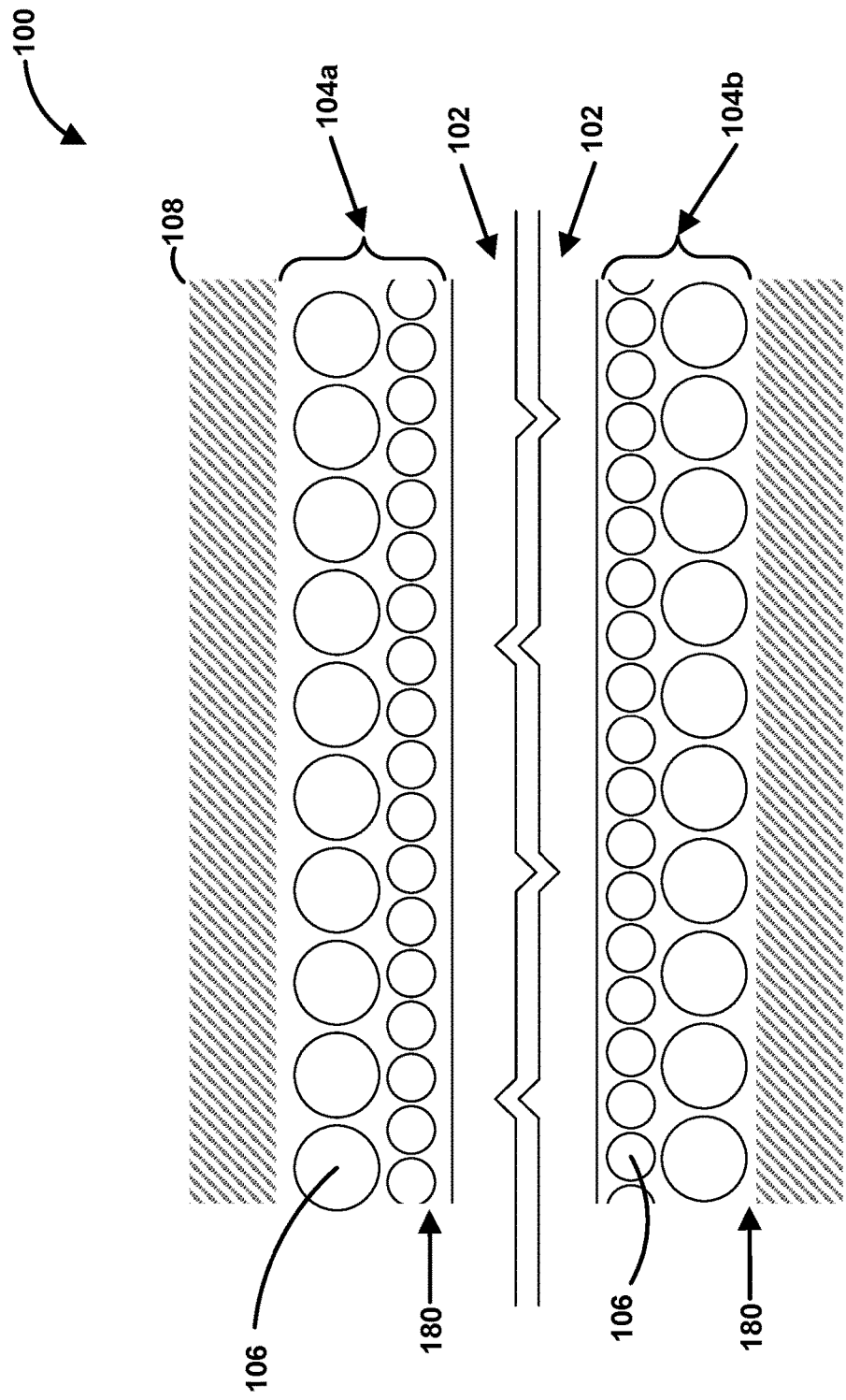
FIG. 1B is a cross-sectional view of an exemplary membrane-electrode assembly in accordance with various exemplary embodiments.

With reference to FIGS. 1A and 1B, in various embodiments, a membrane-electrode assembly 100 is illustrated. MEA 100 comprises a pair of electrodes 104a and 104b positioned on either side of and affixed to an exchange membrane 102. In various embodiments, MEA 100 is a membrane-electrode assembly used in a fuel cell, such as a proton exchange membrane-based fuel cell.

In various embodiments, electrode 104a and/or 104b comprises a catalyst layer 180. Catalyst layer 180 catalyzes an electrochemical reaction or reactions that convert chemical constituents and generate electrical energy. For example, catalyst layer 180 can provide catalytic support for electrode reactions which occur in MEA 100.

In various embodiments, electrode 104a is operable as an anode. An anodic reaction can occur within electrode 104a, such as the oxidation of a fuel source. For example, the oxidation reaction can comprise the disassociation of protons and electrons from a diatomic hydrogen molecule. In such embodiments, catalyst layer 180 of electrode 104a facilitates the oxidation of diatomic hydrogen gas by providing catalytic support for the anodic reaction.

Further, in various embodiments electrode 104b is operable as a cathode. A cathodic reaction can occur within electrode 104b, such as the reduction of oxygen. For example, the reduction of oxygen in cathode 104b can comprise the combination of protons, electrons, and diatomic oxygen to form water molecules. In such embodiments, catalyst layer 180 of electrode 104b facilitates formation of water by providing catalytic support for a cathodic reaction.

In various embodiments, catalyst layer 180 comprises electrically-active catalyst particles that facilitate the anodic and/or cathodic reaction occurring in electrodes 104a and/or 104b. For example, catalyst particles can comprise electrically-active platinum group metals, such as platinum, non-platinum group metal transition-metal-based n4-macrocyclic metal complexes, and/or the like. Although described with reference to specific catalyst particles, any suitable catalyst particles capable of catalyzing anodic or cathodic reactions within an MEA are within the scope of the present disclosure.

In various embodiments, catalyst layer 180 further comprises support particles onto which the individual catalyst particles are adhered and thereby supported. In various embodiments, for example, support particles can comprise carbon-based particles having average sizes that are larger than the average size of the catalyst particles. In various exemplary embodiments, catalyst particles can range in size from 1 nm to 10 nm in the longest dimension. Moreover, support particles can range in size from 30 nm to 200 nm in the longest dimension. In one exemplary embodiment, catalyst particles having a size of 4 nm in the longest dimension are adhered to a support particle having a size of 50 nm in the longest dimension. Moreover, multiple catalyst particles can be adhered to and thus supported by a single support particle. For example, a single support particle may have 1, 2, 3, 5, 10, 20, 50, 100, or even more catalyst particles adhered thereto.

In various embodiments, the support particles comprise a carbon-based article or material such as one or more of paracrystalline carbon (e.g., carbon black), carbon nanotubes, diamond, graphite, graphene, tungsten carbide, silicon carbide, and/or the like. Additionally, the support particles may comprise articles or materials not including carbon, such as one or more of titanium dioxide, iridium oxide, tungsten oxide, tin oxide, niobium oxide, and/or the like. Although described with reference to specific materials, any suitable support particle (or combination, blend, or mixture of particles) capable of supporting catalyst particles within catalyst layer 180 is within the scope of the present disclosure.

Support particles and electrically-active catalyst particles can be provided together, for example in a commercially-available mixture. The use of catalyst inks, catalyst powders, or other mixtures of support particles and catalyst particles is within the scope of the present disclosure. Stated another way, catalyst layer(s) 180 in accordance with various exemplary embodiments can be prepared using individual chemical components or mixtures of chemical components.

In various embodiments, catalyst layer 180 comprises a proton-conducting ionomer. The combined catalyst particles and support particles may be impregnated with the proton-conducting ionomer to facilitate transport of protons through catalyst layer 180 and towards, for example, a proton exchange membrane 102. Suitable proton-conducting ionomers include perfluorosulfonic acid (PFSA), sulfonated tetrafluoroethylene based flouropolymers (such as Nafion®, sold by The Chemours Company), perfluoro imide acids (PFIA), hydrocarbon-based ionomers, and/or the like.

In other embodiments, catalyst layer 180 comprises an anion-conducting polymer. For example, catalyst layer 180 may be utilized in an anion exchange membrane, and comprise an ionomer such as short, medium, and/or long side chain quaternary polyphenylene oxides (QPPO), among others suitable for use in an anion exchange membrane. The use of any suitable ionomer is within the scope of the present disclosure.

In various embodiments, catalyst layer 180 can comprise one or more layers of structured units 106. In catalyst layer 180, structured units 106 may be arranged generally in overlapping planes, for example planes of generally spherical structured units 106 such that structured units 106 of one plane are positioned generally at least partially within voids between structured units 106 of another plane. In this manner, the density of structured units 106 in catalyst layer 180 is increased. In other exemplary embodiments, structured units 106 may be dispersed generally at random in catalyst layer 180. Moreover, structured units 106 may be disposed and/or positioned in catalyst layer 180 in any suitable manner.

With momentary reference to FIG. 1B, in some exemplary embodiments catalyst layer 180 comprises at least one layer of structured units 106 having a first size, and a second layer of structured units 106 having a second, different size. For example, structured units 106 disposed in a layer generally adjacent to (and/or close to) exchange membrane 102 may be smaller, resulting in a higher number of connected ionic channels. Moreover, structured units 106 disposed in a layer generally adjacent to (and/or close to) a micro-porous layer 108 may be larger, resulting in larger channels for gas to enter. While the example shown in FIG. 1B illustrates a single layer of smaller structured units 106 and a single layer of larger structure, it will be appreciated that multiple sub-layers may exist in each such layer therein, and/or that repeating and/or alternating patterns of layers having differing sizes and/or shapes of structured units 106 may be utilized.

Figure 2A:
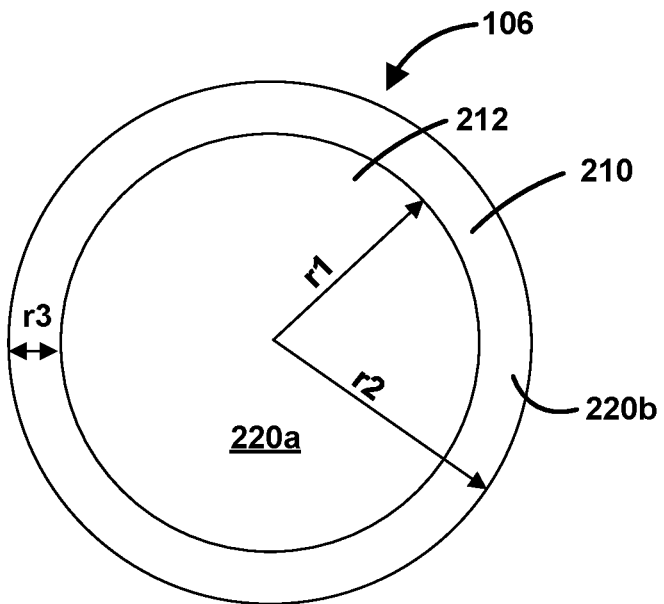
FIG. 2A is a schematic view of an exemplary structured unit of a catalyst layer in accordance with various exemplary embodiments.
Figure 2B:
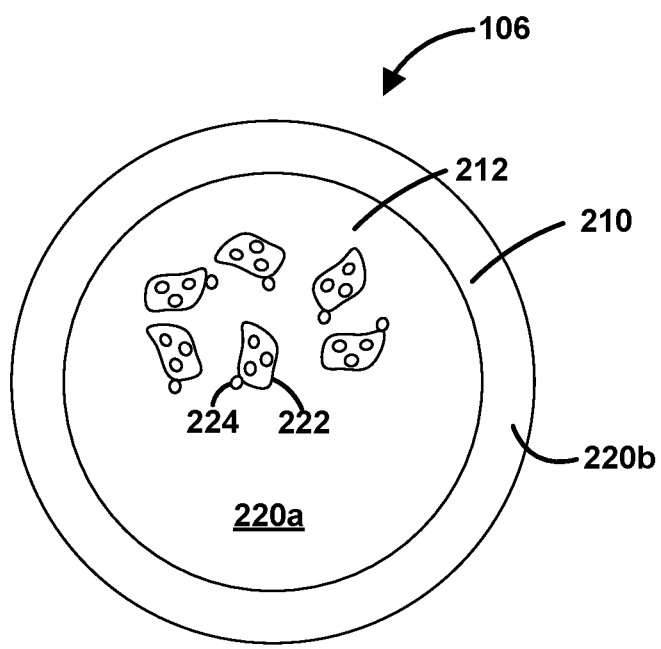
FIG. 2B is a cross-sectional view of an exemplary structured unit of a catalyst layer in accordance with various exemplary embodiments.

With initial reference to FIGS. 2A and 2B, structured units 106 can comprise a core-and-shell type structure. For example, structured units 106 can comprise a shell 210 surrounding a core 212. In various embodiments, structured units 106 comprise an approximately spherical shape having a radius r2. In other embodiments, structured units 106 comprise a non-spherical shape having an effective radius of r2. For non-spherical shapes, effective radius r2 can be calculated or approximated as:

$$r2 = \sqrt{\left(\frac{A}{4\pi}\right)}$$

where A is the surface area of the non-spherical shape.

For illustrative purposes, structured units 106 will be further described in reference to a spherical shape with a radius of r2. However, it will be understood that structured units 106, including one or more individual components of structured units 106 such as shell 210 and core 212, can comprise other three-dimensional shapes as well, such as ovoid shapes, polyhedra, irregular shapes, and/or the like.

In various embodiments, core 212 comprises a sphere having a radius of r1. Shell 210 comprises a spherical outer layer surrounding core 212 and having a thickness of r2-r1 (e.g., shell 210 is configured as a spherical shell considered to begin at r1 and extending to r2). In various embodiments, r2 is between 35 nanometers and 1,600 nanometers. In various embodiments, r1 is between 25 nanometers and 1,500 nanometers.

Core 212 can comprise, include, and/or contain a number of support particles 222. In various embodiments, support particles 222 are configured with an average length, in a longest dimension, of between 60 nanometers and 200 nanometers. For support particles 222 having a generally spherical shape, support particles 222 may be configured with a radius of between 30 nanometers and 100 nanometers.

One or more catalyst particles 224 can be physically adhered to and supported by a corresponding support particle 222. Catalyst particles 224 may be adhered to a support particle 222 in any suitable manner, for example via van der Waals forces.

In various embodiments, core 212 further comprises, includes, and/or contains at least one ionomer 220a. For example, ionomer 220a can at least partially surround support particles 222 and catalyst particles 224. Ionomer 220a can comprise any suitable proton-conducting ionomer, such as a sulfonated tetrafluoroethylene-based fluoropolymer. In various embodiments, core 212 comprises an overall ratio of ionomer to carbon of between 0.01 and 0.5. "Ionomer to carbon ratio" (or "I/C ratio") is a commonly used term in the design of catalyst layers and is a relative measure of the amount of ionomer compared to the amount of carbon support (i.e., support particles 222) for the catalyst (i.e., catalyst particles 224). If the percentage of catalyst support is known, the I/C ratio may also be determined. The I/C ratio may also be utilized for catalysts that do not contain carbon, or catalysts that are PGM-free (which contain C-N structures). Stated another way, core 212 can comprise more of support particles 222 and catalyst particles 224 than ionomer 220a (for example, core 212 may comprise between 50% and 60%, or further, 55% of support particles 222, between 35% and 40%, or further, 37% of catalyst particles 224, and 5% of ionomer 220a, resulting in an I/C ratio of approximately 0.1, where the foregoing percentages are in terms of mass). In a contrasting example, an exemplary shell 210, having an I/C ratio of approximately 10, may comprise 8.6% of support particles 222, 5.7% of catalyst particles 224, and 85.7% of ionomer 220a by mass and may be formed utilizing a catalyst powder comprising 40% platinum and 60% carbon.

Shell 210 can comprise a second ionomer 220b. In various embodiments, second ionomer 220b is the same ionomer as 220a of core 212. In other embodiments, ionomer 220a and 220*b* are different ionomers. Moreover, three or more ionomers may also be utilized, for example in order to achieve a desired performance characteristic, cost, or other aspect of the overall ionomer component. In various embodiments, shell 210 can comprise an overall ratio (i.e., summing all ionomers present) of ionomer to carbon of between 0.7 and 5.0.

Conventionally, excess ionomer is typically included in a catalyst layer to ensure adequate conductivity within the catalyst layer. Specifically, the non-uniform distribution of catalyst particles and support particles may necessitate excess ionomer use in the catalyst layer. However, excessive ionomer can cause bonding of the ionomer to catalyst surfaces, causing sulfonate-ion poisoning of catalyst sites. Such poisoning of the catalyst can reduce oxygen reduction reaction kinetics. The ionomer bound to the catalyst surface can also stiffen, increasing Knudsen-dominated gas transport effects. Further, excess ionomer can cause an overall increase in the hydrophilicity of the catalyst layer.

Accordingly, in various embodiments, utilizing principles of the present disclosure (for example, by providing core 212 having a first I/C ratio surrounded by a shell 210 having a second I/C ratio that is higher than the first I/C ratio) can more effectively and optimally utilize ionomer. For example, this approach creates "reservoirs" of protons that increase the ionic conductivity of water within the catalyst layer (through which the Grotthuss mechanism or vehicular mechanism will transport protons to catalytic sites of catalyst particles 224 within core 212) without increasing poisoning of the catalyst surface and/or without increasing gas transport resistance. Structured units 106 can, for example, improve catalyst utilization by producing more electrical current with the same catalyst content, or requiring less catalyst to produce the same electrical current. Additionally, a smaller amount of total ionomer may be utilized, reducing overall hydrophilicity and improving durability of the catalyst layer.

An I/C ratio can be determined, calculated, and/or measured at particular points or radii within structured units 106. For example, in various embodiments the I/C ratio of core 212 at or near r1 is between 0.1 and 0.9. Further, in various embodiments the I/C ratio of shell 210 at or near r2 is between 0.9 and 5. In various embodiments, the I/C ratio of shell 210 (e.g., between r1 and r2 of structured unit 106) is higher than the I/C ratio of any point in core 212 (e.g., at any point between the effective center of structured unit 106 and r1).

Figure 3:
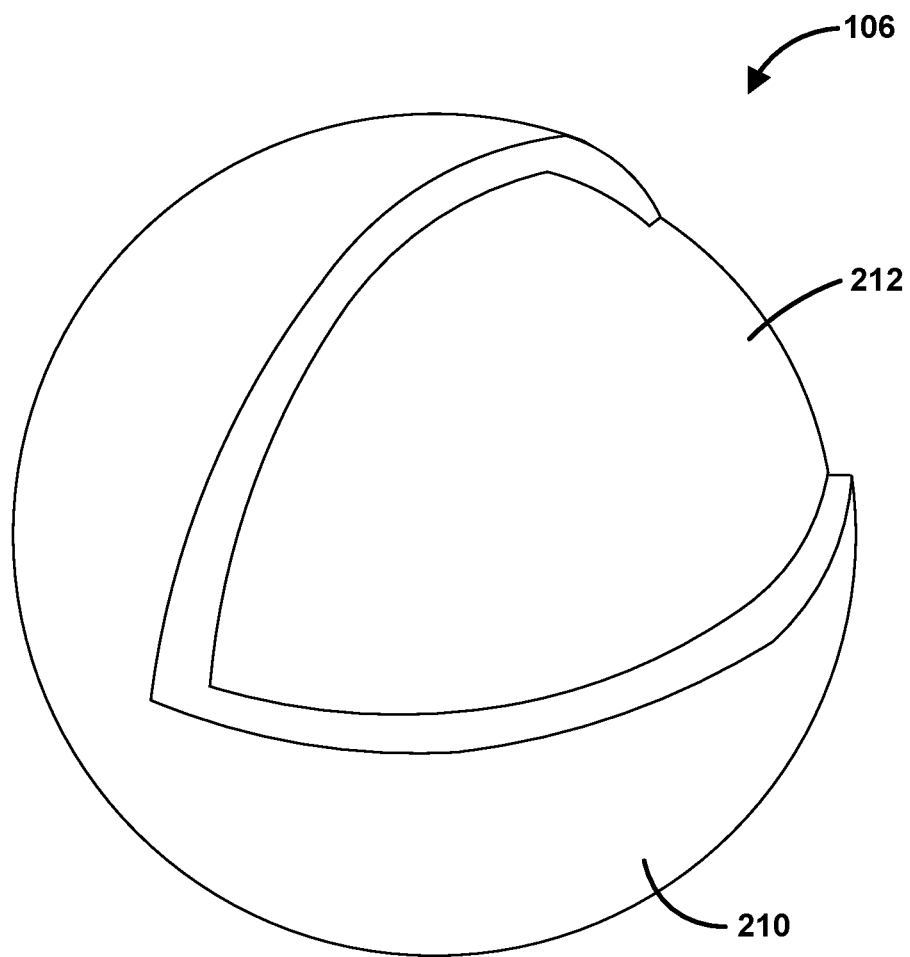
FIG. 3 is a perspective view of an exemplary structured unit of a catalyst layer showing a portion of an outer shell removed, in accordance with various exemplary embodiments.

With momentary reference now to FIG. 3, in various exemplary embodiments shell 210 may have a generally constant thickness (i.e., a thickness varying by +/−10%), wherever on structured unit 106 the thickness is measured. However, it will be appreciated that process variations, material differences, structured unit 106 geometry, and/or the like may result in configurations where shell 210 varies in thickness depending on the location on structured unit 106 where the thickness is measured. All such variations, combinations, and configurations are considered to be within the scope of the present disclosure.

Figure 4A:
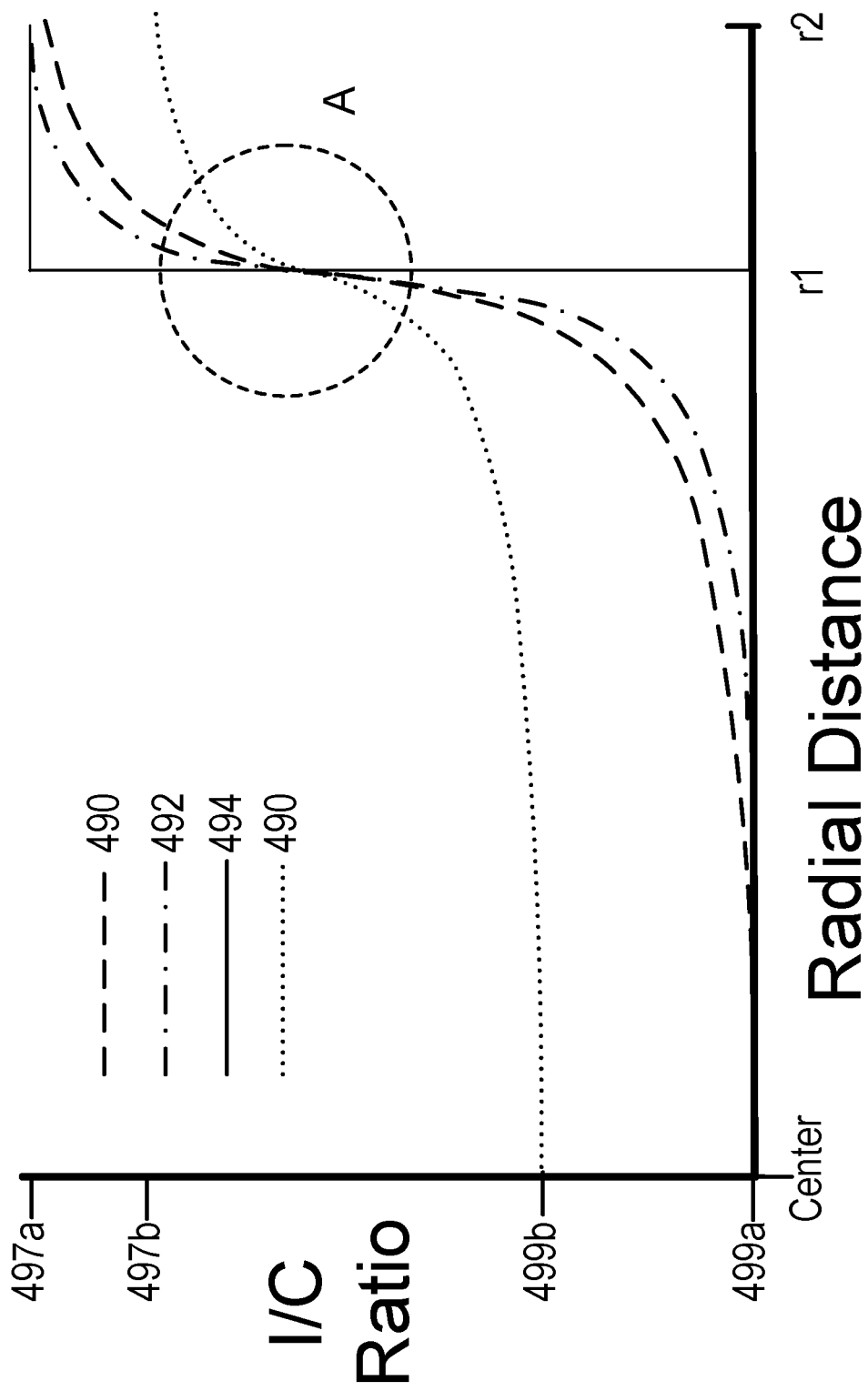
FIG. 4A is a graphical representation of a number of different relative ionomer concentration profiles in accordance with various exemplary embodiments.
Figure 4B:
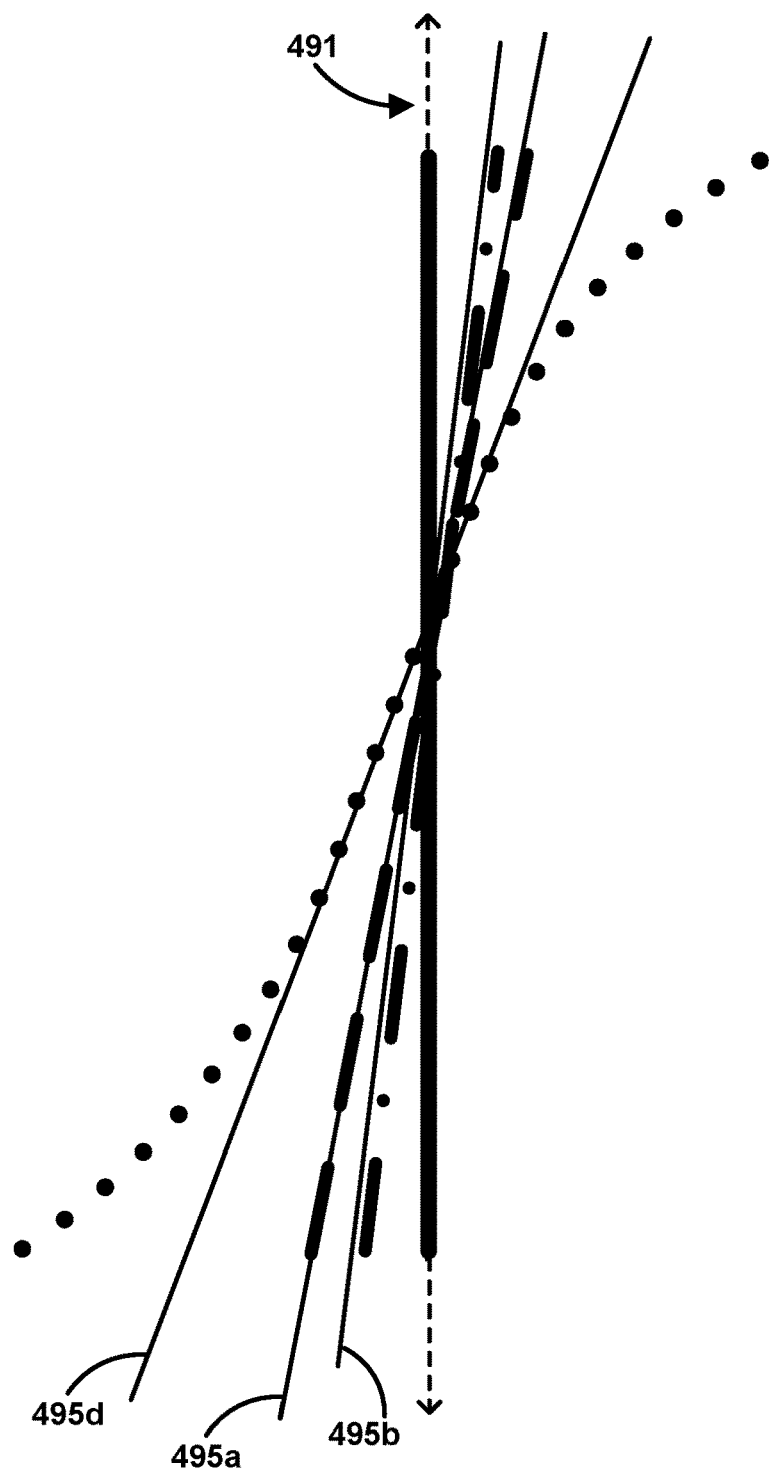
FIG. 4B is a close up of section "A" of the graphical representation of a number of different relative ionomer concentration profiles of FIG. 4A.

With initial reference to FIGS. 4A and 4B, various I/C profiles of an exemplary structured unit 106 are graphically represented. In various embodiments, the I/C ratio within core 212 increases from a first value at or near the effective center of structured unit 106 and increases to a second, larger value at or near r1. The I/C ratio within shell 210 may increase from a third value at or near r1 to a fourth, larger value at or near r2. For example, when graphically represented, the I/C ratio from the effective center of structured unit 106 to a radius at or near r2 comprises (or may be represented by) a sigmoidal function. In various embodiments, r1 is the point in structured unit 106 at which an inflection point of the function representing the I/C ratio occurs. An inflection point is a point in a given function (such as a sigmoidal function) where the function changes from convex to concave (or vice versa); at an inflection point, the third derivative of the function is zero. Stated another way, in various exemplary embodiments core 212 ends, and shell 210 begins, at an inflection point of a function representing the I/C ratio.

For example, an I/C ratio profile 490 can comprise (or be represented by) a sigmoidal function that starts at a minimum value 499*a* (for example, at the center of a structured unit 106) and approaches (or reaches) a maximum value 497*a* at r2. In various embodiments, minimum value 499*a* is greater than zero and can be between 0.01 and 0.5, and preferentially, between 0.1 and 0.4. Further, maximum value 497*a* can be between 0.7 and 5.0, and preferentially, between 1 and 2.

I/C ratio profile 490 can further comprise, for example, an inflection point at r1 having a tangent 495*a*. In various embodiments, tangent 495*a* has a slope relative to a horizontal axis 493 of greater than 1.0.

Another I/C ratio profile 492 can comprise (or be represented by) a sigmoidal function that starts at a minimum value 499*a* and approaches a maximum value 497*a* at r2. In various embodiments, minimum value 499*a* is greater than zero and can be between 0.01 and 0.5, and preferentially, between 0.1 and 0.4. Further, maximum value 497*a* can be between 0.7 and 5, and preferentially, between 1.0 and 2.0. I/C ratio profile 492 further comprises, for example, an inflection point at r1 having a tangent 495*b*. In various embodiments, tangent 495*b* has a slope relative to horizontal axis 493 of greater than 1.0 but lower than the slope of tangent 495*a* of I/C ratio profile 490.

Yet another I/C ratio profile 494 can comprise (or be represented by) a sigmoidal function that approximates a step function. In various embodiments, I/C ratio profile 494 starts at a minimum value 499*a* and ends at a maximum value 497*a* at r2, with an inflection point at r1 having a slope relative to a vertical axis 491 of between 0.1 and zero. In such embodiments, the I/C ratio is nearly constant (i.e., within 10%) at or near minimum value 499*a* from the effective center of structured unit 106 to r1, then increases from minimum value 499*a* to maximum value 497*a* at r1 (i.e., within 10% of 497*a*). Stated another way, core 212 comprises a constant (and/or varying less than 10%) first I/C ratio, and shell 210 comprises a constant (and/or varying less than 10%) second and higher I/C ratio.

Still another exemplary I/C ratio 496 can comprise (or be represented by) a sigmoidal function that starts at a minimum value 499*b* and approaches (or reaches) a maximum value 497*b* at r2. In various embodiments, minimum value 499*b* is greater than zero and can be between 0.01 and 0.5, and preferentially, between 0.1 and 0.4. Further, maximum value 497*a* can be between 0.7 and 5.0, and preferentially, between 1.0 and 2.0.

I/C ratio profile 496 can further comprise, for example, an inflection point at r1 having a tangent 495*d*. In various embodiments, tangent 495*a* has a slope relative to horizontal axis 493 of greater than 1.0, but lower than such slope of tangent 495*a* and/or tangent 495*b* of I/C ratio profiles 490 and 492 respectively.

Exemplary I/C profiles 490, 492, 494, and 496 illustrate various configurations of structured units 106, including the I/C profiles of corresponding cores 212 and shells 210. Any suitable combination of I/C profiles, including various minimum values, maximum values, inflection point tangent slope values, profile characteristics between a minimum value and an inflection point, and profile characteristics between an inflection point and a maximum value, are within the scope of the present disclosure.

In various embodiments, catalyst layer 180 comprising structured units 106 may comprise or be configured with a higher number (and/or higher concentration) of primary pores than conventional catalyst layers. Because a smaller amount of ionomer is used in structured units 106, more primary pores may be available for improved transport (for example, of water) within catalyst layer 180. In various embodiments, structured units 106 allow for improved ionic conductivity of catalyst layer 180 over conventional designs because the increased number of smaller, primary pores allows for capillary condensation of water.

Additionally, in various embodiments catalyst layer 180 can comprise or be configured with macro pores. For example, structured units 106 can be spaced along a layer of catalyst layer 180 such that there is space between the structured units 106 that can be described as macro pores or tertiary pores. Such a pore distribution can reduce flooding of catalyst layer 180 at high relative humidities (for example, relative humidities above 80%) by providing for improved water management through catalyst layer 180 (as compared to conventional catalyst layer designs). Improved water management through catalyst layer 180 can provide for longer life span and/or more efficient operation of catalyst layer 180, and in turn, an MEA in which catalyst layer 180 is utilized. Further, configuring catalyst layer 180 with macro pores as contemplated in various exemplary embodiments improves oxygen diffusivity.

In various exemplary embodiments, catalyst layer 180 is configured with (and/or achieves or exhibits) improved resistance against cracking during operation. Cracking of the catalyst layer of an MEA is a primary mode of failure. For example, in conventional catalyst layer designs, expansion and contraction of the catalyst layer (corresponding with increasing and decreasing relative humidity within the catalyst layer during operation) can propagate cracks within the catalyst layer. In various embodiments, the physical structure of structured units 106 provides for improved expansion and contraction during operation. This is due at least in part to structured units 106 being more uniform than conventional catalyst layer agglomerates and therefore the space between these units is more uniform as well; combined with the fact that the void spaces will simply be larger yields the ability to swell uniformly into these larger spaces and reduce and/or prevent catastrophic catalyst layer failure (i.e. cracking). Thus, application of principles of the present disclosure ensures that cracks are less likely to form and propagate through catalyst layer 180. This improved performance increases the life span of catalyst layer 180.

In various embodiments, core 212 and/or shell 210 comprise one or more additives. For example, additives can include chemical constituents that impart a benefit or increase in performance of core 212 and/or shell 210, such as improved stability, rigidity, transport of chemical reactants or products of electrochemical reactions, or other parameters of catalyst layer 180. Suitable additives can comprise one or more of a hydrophobic polymer (e.g., polyvinylidene fluoride or acids formed from this polymer), a radical scavenging ion or compound (e.g. cerium oxide, $CeO_2$), hydrophobic powders (e.g. Teflon-coated carbon), and/or other suitable additives or combinations of additives.

In various embodiments, an additive can comprise a concentration of between 0.01% and 10% in core 212 and/or shell 210 by mass.

Core 212 and shell 210 can comprise and/or be configured with different concentrations of a similar or identical additive. Alternatively, core 212 and shell 210 comprise and/or are configured with different additives and/or additive concentrations. In yet other embodiments, only one of core 212 or shell 210 comprises or is configured with one or more additives. Although described with reference to particular embodiments, any combination of suitable additives in core 212 and/or shell 210 is within the scope of the present disclosure.

Table 1 illustrates exemplary characteristics of catalyst layer 180, including structured units 106, in accordance with various embodiments.

TABLE 1

| Parameter | Range |
|---|---|
| Core Overall I/C Ratio | 0-1 |
| Shell Overall I/C Ratio | 0.5-100 |
| Catalyst Type | PGM-based, PGM-alloy, and/or PGM-free |
| Catalyst Support Type | Carbon blacks, carbon nanotubes, diamond, graphite, graphene, silicon carbide, titanium dioxide, iridium oxide, tungsten oxide, tin oxide, niobium oxide, tungsten carbide |
| Ionomer Type | Perfluorosulfonic acid (PFSA), Perfluoro Imide Acids (PFIA), hydrocarbon-based. Long side chain, medium side chain, short side chain, quaternary polyphenylene oxide (QPPO) |
| Ionomer Counter-ion | $H^+$, $Na^+$, $Li^+$, $K^+$, $Cs^+$ |
| Ionomer EW | 600 EW-1200 EW |
| Solid % in "core solution/dispersion" | 1%-25% |
| Solid % in "shell solution/dispersion" | 1%-50% |
| Additives | Polyvinylidene fluoride (and other hydrophobic polymers), cerium (and other radical scavenging compounds) |
| Additive concentration range | 0.01%-5% |
| r1 | 25 nm-1.5 micron |
| r3 | 10 nm-100 nm (thickness of shell 210) |
| r2 | 35 nm-1.6 micron |

Figure 5:
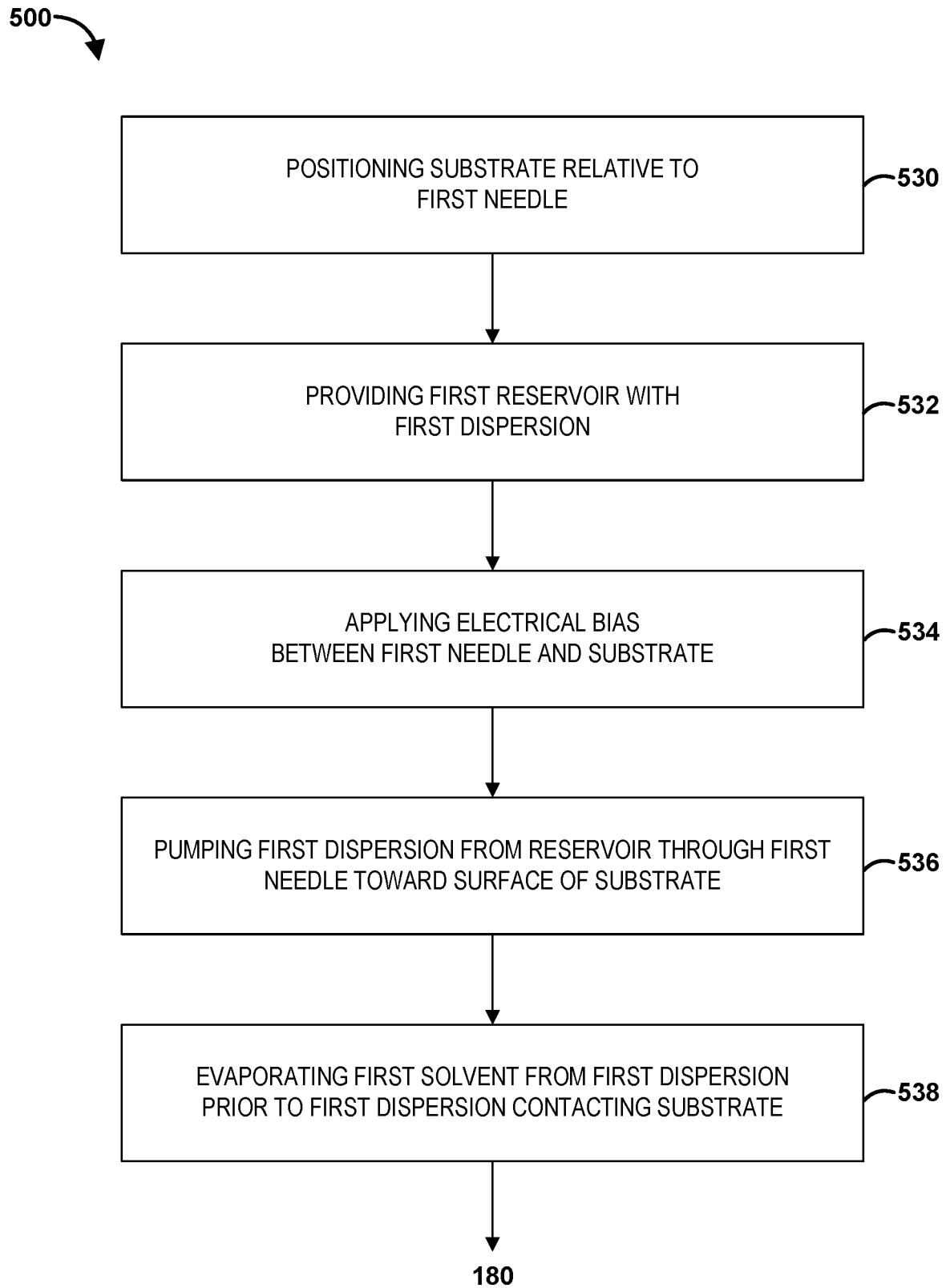
FIG. 5 illustrates an exemplary method of making a catalyst layer in accordance with various exemplary embodiments.

With reference now to FIG. 5, a method 500 for forming a catalyst layer of structured units in accordance with various exemplary embodiments is illustrated. Method 500 can, for example, form a catalyst layer 180 for use in an MEA.

In various embodiments, method 500 utilizes an electrospraying process to form a catalyst layer (such as catalyst layer 180) comprising one or more vertically-stacked layers of structured catalyst units (such as structured units 106). For example, electrospraying can comprise spraying one or more ion-containing dispersions in an electric field to form relatively or substantially spherical units or particles. As will be described in detail, an electrical bias can be applied between the needle through which the dispersions are sprayed and a substrate onto which the dispersion is to be adhered. As the dispersion exits the needle, a taylor cone is formed, creating a liquid jet of the dispersion. As the jet travels towards the substrate, the ionic components of the dispersion are drawn towards the outside surface of the jet. In various embodiments, the core and shell structure are formed as one or more dispersions exit the needle, pass through the electric field, and deposit on the substrate.

In various embodiments, method 500 comprises a step 530 of positioning a substrate relative to a first needle of an electrospray apparatus. In various embodiments, method 500 comprises depositing a catalyst layer on an intermediate substrate, commonly referred to as a decal transfer technique. For example, the intermediate substrate can comprise a decal onto which a catalyst layer is deposited. As will be discussed further, the decal can then be used to transfer the catalyst layer to an exchange membrane. Conventional methods of forming an MEA utilize a decal transfer method because exchange membranes (such as proton exchange membranes) can be negatively impacted by solvent, and therefore are unsuitable substrates for deposition techniques that apply "wet" (i.e., solvent-containing) catalyst layers to substrates.

In other embodiments, in contrast to conventional techniques for forming MEAs, method 500 comprises direct deposition of catalyst layer 180 onto an exchange membrane (such as a proton exchange membrane). For example, as will be discussed in greater detail, because structured units 106 and catalyst layer 180 are substantially free from solvent (i.e., comprising less than 1% of solvent by mass, or further, less than 0.1% of solvent by mass), catalyst layer 180 can be directly applied to an exchange membrane. This allows for faster, simpler, and/or lower-cost manufacturing.

Any suitable substrate (including gas diffusion layers and other substrates utilized in fuel cells) onto which a catalyst layer can be deposited is within the scope of the present disclosure. The substrate is positioned at a desired distance from the needle. As will be discussed in more detail, this distance can be determined or selected based at least in part on the physical properties of the chemical constituents of the first dispersion.

Step 530 can comprise, for example, placing a substrate on a platform at a position below the first needle of the electrospray apparatus. In various embodiments, the distance between the first needle and the substrate is between 5 centimeters and 30 centimeters. However, any suitable distance may be utilized, as desired.

Method 500 further comprises providing a first reservoir of a first dispersion (step 532). For example, the first dispersion can comprise the desired chemical components of structured units 106. In various embodiments, the first dispersion comprises a mixture of catalyst particles (such as catalyst particles 224), carbon-containing support particles (such as support particles 222), and an ionomer (such as first ionomer 220*a*) in a solvent. Solvents may include, for example, water, alcohols, dimethylformamide, dimethylacetamide, tetrahydrofuran, acetone, ketones, and/or any other suitable solvent or combinations thereof. In various embodiments, the first dispersion can comprise an additive or additives, such as those described above.

In various embodiments, method 500 further comprises a step 534 of applying an electrical bias between the first needle and the substrate. For example, the substrate can be placed on an electrically conductive metal plate, such as an aluminum or steel plate. The conductive metal plate and the first needle may be coupled to a power source capable of applying an electrical bias between the first needle and the conductive plate, and therefore, the substrate positioned on the conductive plate.

Method 500 further comprises a step 536 of pumping or otherwise transferring a first dispersion from a first reservoir through the first needle towards the substrate. As previously described, as the first dispersion exits the needle, the electrical field causes the liquid to form a relatively thin jet that travels toward the substrate.

In various embodiments, method 500 further comprises a step of evaporating at least a portion of the solvent from the first dispersion prior to the first dispersion contacting the substrate. For example, as the first dispersion exits the first needle and passes through the electric field travelling towards the substrate, the solvent can partially and/or fully evaporate from the dispersion. This evaporation can solidify the form of structured unit 106. Stated another way, the dispersion forms into the physical core-and-shell structure as it travels towards the substrate and dries, such that structured unit 106 is substantially free of solvent (i.e., contains less than 1 percent of solvent) before it contacts the substrate.

The distance between the exit of the first needle and the substrate can be selected to ensure that most (e.g., above 99 percent) or all of the first solvent evaporates before structured units 106 contact the substrate. In various embodiments, drying of structured units 106 prior to contacting the substrate and forming catalyst layer 180 can reduce or eliminate cracking in the catalyst layer. Conventionally, cracks form in the catalyst layer as solvent present in the catalyst layer evaporates. By evaporating most or all of the solvent from a constituent of catalyst layer 180 (i.e., structured units 106), the formation of such cracks in catalyst layer 180 is reduced or eliminated.

Figure 6:
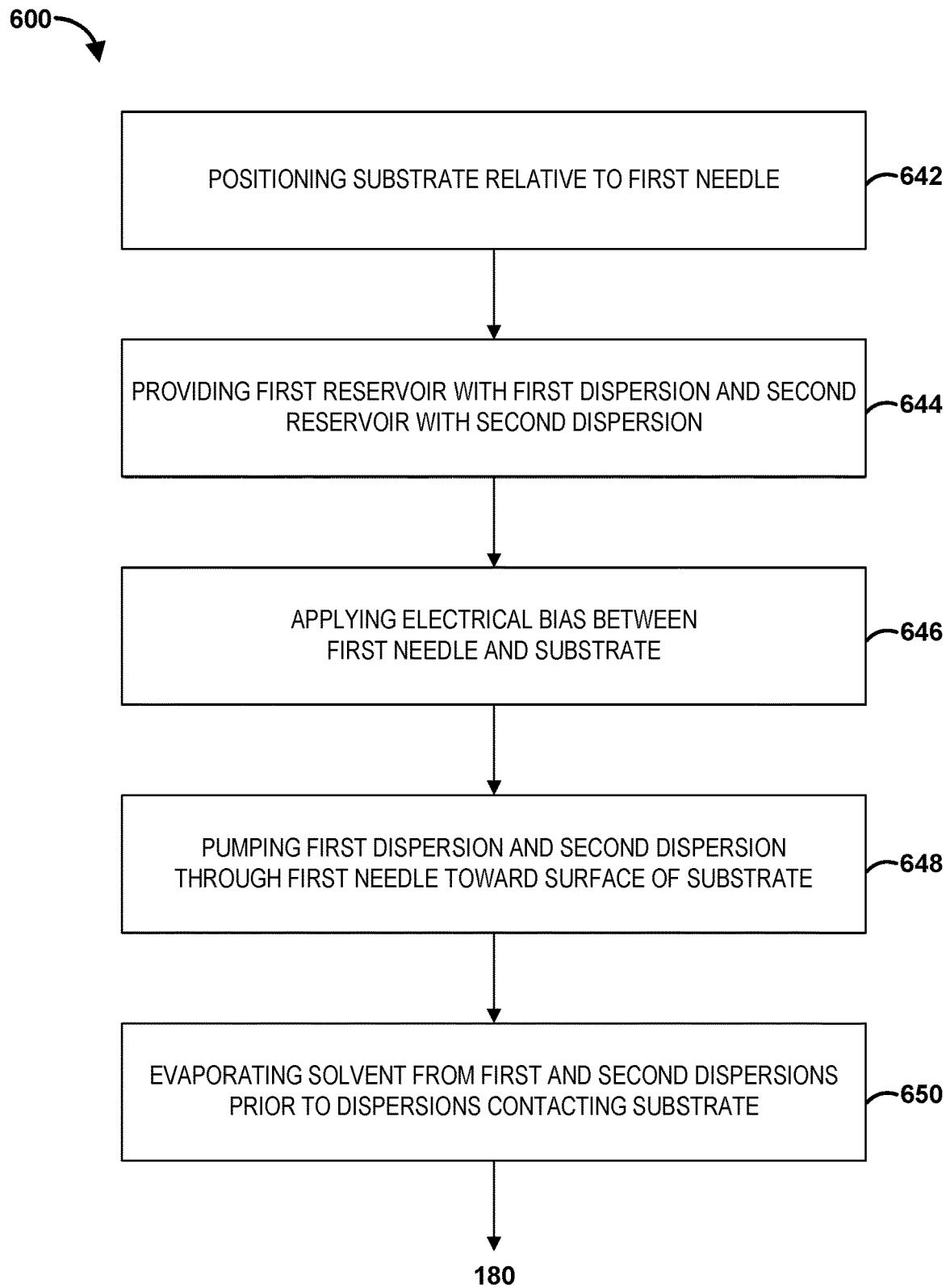
FIG. 6 illustrates another exemplary method of making a catalyst layer in accordance with various exemplary embodiments.

With reference now to FIG. 6, another method 600 of forming a catalyst layer of structured units in accordance with various exemplary embodiments is illustrated. Similar to method 500, method 600 can form a catalyst layer (such as catalyst layer 180), for example a catalyst layer 180 comprising one or more vertically-stacked layers of structured units (such as structured units 106).

In various embodiments, method 600 comprises a step 642 of positioning a substrate relative to a first needle of an electrospray apparatus. Similar to step 530 of method 500, a suitable substrate (such as an exchange membrane or an intermediate substrate) can be positioned below the first needle of an electrospraying apparatus at a predetermined distance. The distance between the first needle and the substrate can comprise, for example, between 5 centimeters and 30 centimeters, but more generally any suitable distance.

Method 600 further comprises a step 644 of providing a first reservoir of a first dispersion and a second reservoir of a second dispersion. For example, the first dispersion can comprise a mixture of catalyst particles 224, support particles 222, and first ionomer 220*a* in a first solvent or mixture of solvents. The second dispersion can comprise a mixture of catalyst particles 224, support particles 222, and second ionomer 220*b* in a second solvent or mixture of solvents. As previously described, first ionomer 220*a* and second ionomer 220*b* can be the same or different from each other. Further, the first solvent and the second solvent (or mixtures) can be the same or different from each other. In various embodiments, at least one of the first dispersion or the second dispersion can comprise one or more additives, such as those described above.

In various embodiments, method 600 further comprises a step 646 of applying an electrical bias between the first needle and the substrate. Similar to step 534 of method 500, step 646 can comprise applying an electrical bias between the first needle and the conductive plate, and therefore, to the substrate positioned on the conductive plate.

Method 600 can further comprise a step 648 of pumping or otherwise transferring the first dispersion from the first reservoir and the second dispersion from the second reservoir through the first needle towards the substrate. In various embodiments, the first needle is in fluid communication with both the first reservoir and the second reservoir, such that the first dispersion and the second dispersion are mixed as they are pumped through the first needle.

In various embodiments, method 600 further comprises a step 650 of evaporating solvent from the first dispersion and the second dispersion before the dispersions contact the substrate. Similar to step 538 of method 500, the first solvent in the first dispersion and the second solvent in the second dispersion are at least partially evaporated before each dispersion reaches the surface of the substrate.

Figure 7:
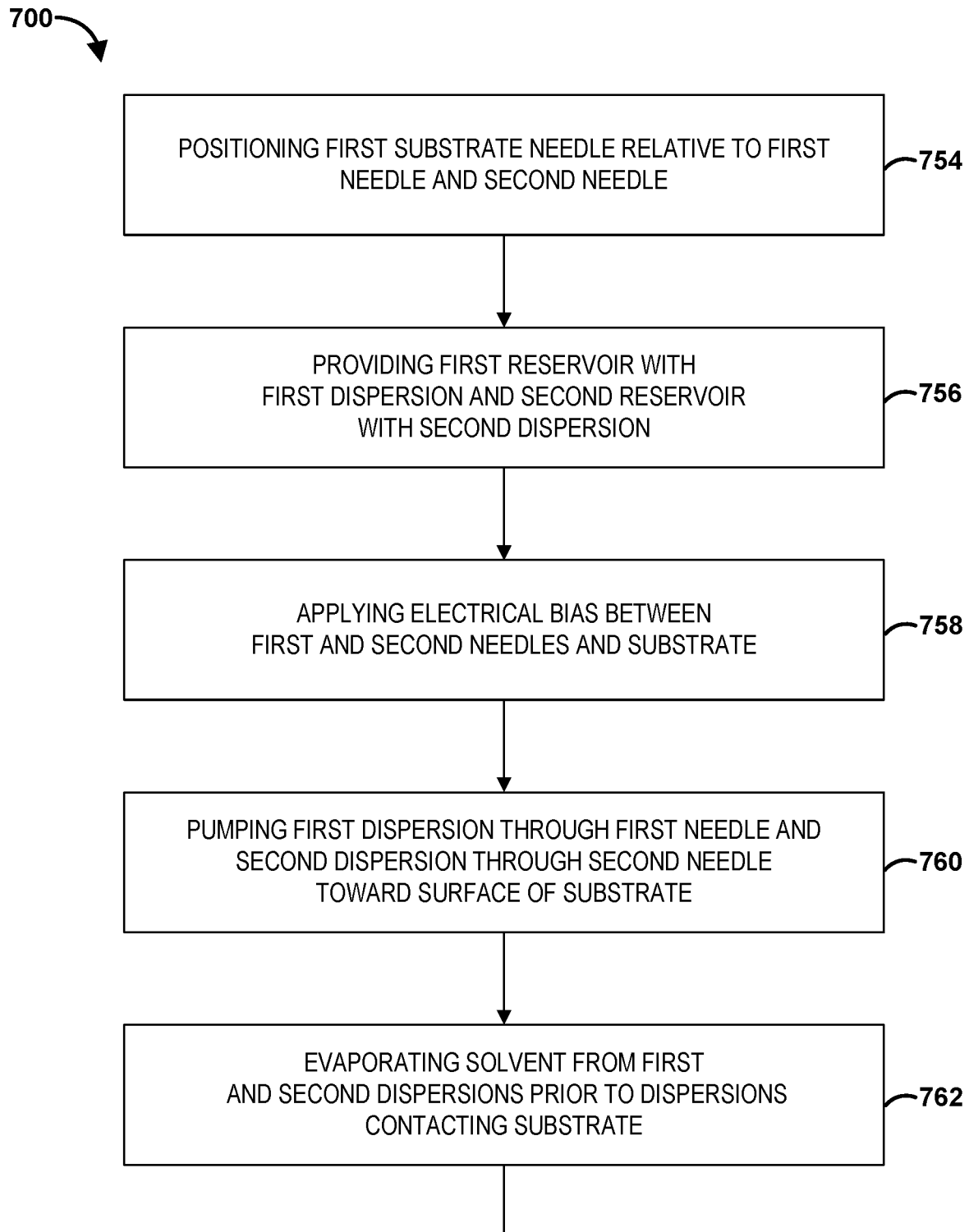
FIG. 7 illustrates yet another exemplary method of making a catalyst layer in accordance with various exemplary embodiments.

With reference now to FIG. 7, another method 700 of forming a catalyst layer of structured units in accordance with various exemplary embodiments is illustrated. In various embodiments, method 700 comprises utilizing two reservoirs, each fluidly coupled to a cannula and a separate needle.

In various embodiments, method 700 comprises a step 754 of positioning a substrate relative to a first needle and a second needle of an electrospray apparatus. Similar to step 530 of method 500, a suitable substrate (such as an exchange membrane or an intermediate substrate) can be positioned below a needle (or needles) of an electrospraying apparatus at a predetermined distance. The distance between the needle(s) and the substrate can comprise, for example, between 5 centimeters and 30 centimeters, and more generally, any suitable distance.

In various embodiments, the first needle and the second needle are positioned coaxially relative to each other. For example, the first needle may be surrounded coaxially by the second needle. In other embodiments, the first needle and the second needle are separate from one another such as, for example, positioned side-by-side.

Method 700 can further comprise a step 756 of providing a first reservoir of a first dispersion and a second reservoir of a second dispersion. Similar to step 644 of method 600, the first dispersion can comprise a mixture of catalyst particles 224, support particles 222, and first ionomer 220*a* in a first solvent or mixture of solvents. The second dispersion can comprise a mixture of catalyst particles 224, support particles 222, and second ionomer 220*b* in a second solvent or mixture of solvents. As previously described, first ionomer 220*a* and second ionomer 220*b* can be the same or different from each other. Further, the first solvent and the second solvent (or mixtures) can be the same or different from each other. In various embodiments, at least one of the first dispersion and the second dispersion can comprise one or more additives, such as those described above.

In various embodiments, method 700 further comprises a step 758 of applying an electrical bias between the needles and the substrate. Similar to step 646 of method 600, step 58 can comprise applying an electrical bias between the first needle and the conductive plate and the second needle and the conductive plate, and therefore, the substrate positioned on the conductive plate.

Method 700 can further comprise a step 760 of pumping or otherwise transferring the first dispersion from the first reservoir and the second dispersion from the second reservoir through their respective needles towards the substrate. Similar to step 648 of method 600, step 760 can comprise pumping the first dispersion through the first needle and towards the substrate. Further, as the first dispersion is being pumped, the second dispersion can be pumped through the second needle and towards the substrate. In such embodiments, in contrast to method 600, the first dispersion and the second dispersion do not mix prior to exiting their respective needles.

In various embodiments, method 700 further comprises a step 762 of evaporating solvent from the first dispersion and the second dispersion before the dispersions contact the substrate. Similar to step 650 of method 600, the solvent in the first dispersion at least partially evaporates before the dispersion contacts the substrate. Further, the second solvent of the second dispersion can at least partially evaporate before reaching the surface of the substrate.

Although described with specific reference to one needle (i.e., the first needle) or two needles (i.e., the first needle and the second needle), methods of forming a catalyst layer in accordance with various exemplary embodiments can utilize three or more needles, for example corresponding with one, two, three, or more dispersions. Additionally, a particular needle may be used to flow a single dispersion, while another needle may be utilized to flow two or more dispersions mixed thereby. Moreover, the flow rate of a particular dispersion through a particular needle may differ from the flow rate of another dispersion through the same needle (and/or differ from the flow rate of another dispersion through a different needle). Yet further, an electrical bias applied between a first needle and a substrate may differ from an electrical bias applied between a second needle and the substrate. Additionally, multiple needles and/or combinations of needles may be utilized; for example, in one embodiment a first dispersion is pumped through a first needle toward a substrate while a second dispersion is pumped through a second needle and a third needle toward the substrate. Still further, characteristics of various needles utilized may differ from one another. For example, a first needle utilized to dispense a first dispersion toward a substrate may have a first lumen size and/or bevel arrangement, while a second needle utilized to dispense a second dispersion toward the substrate may have a second, different lumen size and/or bevel arrangement.

With continuing reference to methods 500, 600 and/or 700, process parameters may be varied to achieve desired configurations of structured units 106 and or catalyst layer 180. For example, increasing a pump rate can increase the thickness of shells 210. Moreover, varying the strength of the electric field and the speed at which the solvent evaporates (for example, by changing the voltage bias and/or by changing a distance between spinnerette and substrate) can change the diameter of structured units 106 produced thereby. All such variations, in for example in continuously variable, alternating, and/or step-wise arrangements or approaches, are within the scope of the present disclosure. Moreover, structured units 106 (for example, in one or more layers) may be produced via a first mechanism or process, and thereafter additional structured units 106 (for example, in one or more additional layers) may be deposited thereon via a second, differing mechanism or process.

Figure 8:
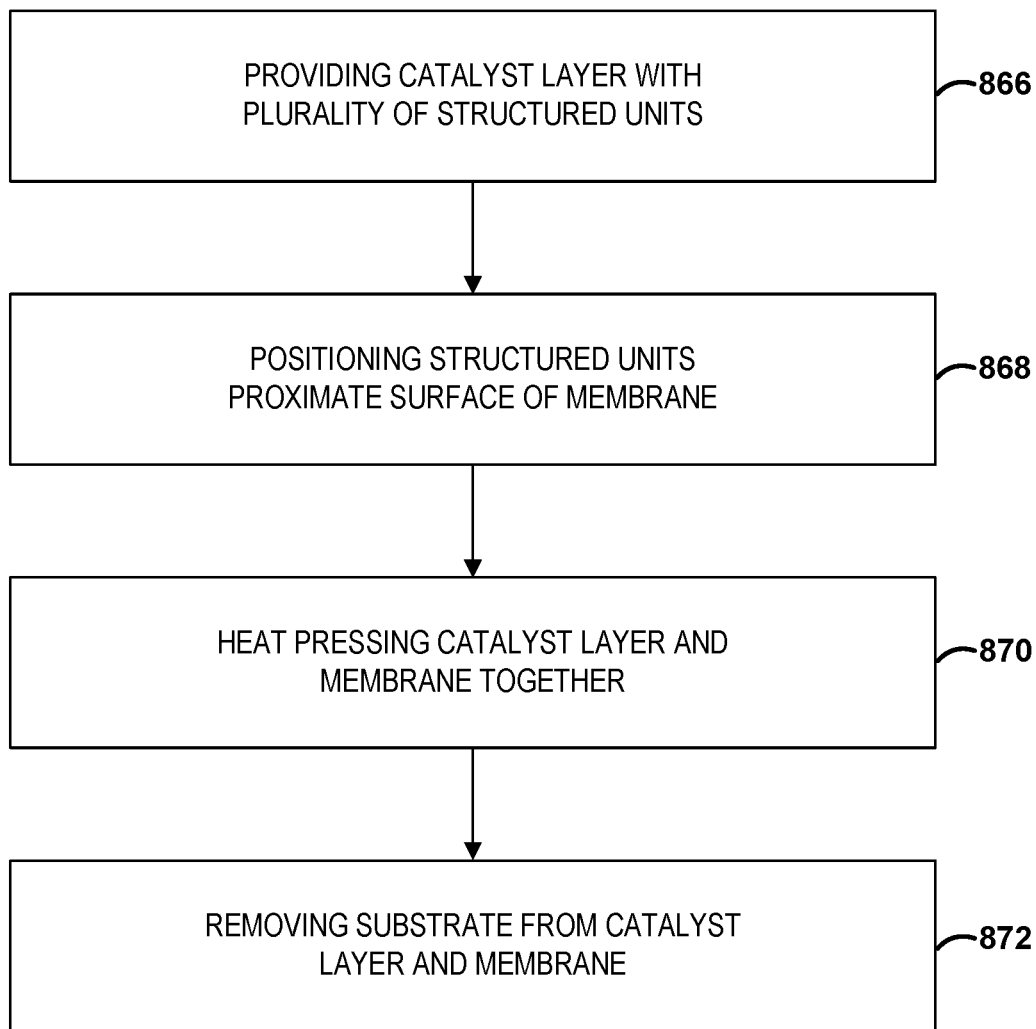
FIG. 8 illustrates an exemplary method of making a membrane-electrode assembly in accordance with various exemplary embodiments.

With reference to FIG. 8, a method 800 of forming an MEA having at least one catalyst layer of structured units in accordance with various exemplary embodiments is illustrated. In various embodiments, method 800 comprises providing a catalyst layer with a layer of structured units (step 866). For example, a catalyst layer 180 as formed by method(s) 500, 600, and/or 700 can be provided for use in forming an MEA.

In various embodiments, method 800 further comprises positioning the structured units proximate a surface of an exchange membrane (step 868). For example, step 868 can comprise positioning catalyst layer 180 such that structured units 106 are proximate and facing a surface of an exchange membrane, such as a proton exchange membrane.

Method 800 can further comprise heat pressing the catalyst layer and the exchange membrane together (step 870). For example, both pressure and heat can be simultaneously applied to the catalyst layer and exchange membrane to adhere the catalyst layer to the membrane. In some embodiments, heat pressing is performed at a temperature of approximately 140 degrees Celsius, for a duration of approximately one minute, and at a pressure of approximately 4 MPa. However, any suitable temperatures, durations, and/or pressures may be utilized.

In various embodiments, method 800 further comprises removing the substrate from the catalyst layer (step 872). For example, after heat pressing the structured units 106 of the catalyst layer 180 to the exchange membrane, the substrate positioned on the opposing side of the catalyst layer 180 is no longer needed. That substrate can be removed, such as by peeling, from the opposing side of the catalyst layer 180.

Method 800 can form an electrode and membrane pair, which constitutes a portion of an MEA. In various embodiments, a second catalyst layer is adhered to the side of the membrane opposite the first catalyst layer. The second catalyst layer can comprise structured units 106 having similar structure and/or composition to those of the first catalyst layer. In other embodiments, the second catalyst layer can comprise a conventionally-made catalyst layer, having no structured units 106; moreover, the second catalyst layer may comprise structured units 106 differing in configuration from those in the first catalyst layer. In various embodiments, heat pressing is applied after a catalyst layer is applied to each side of the membrane.

Table 2 illustrates exemplary and non-limiting operating parameters and characteristics of exemplary methods of forming catalyst layers, such as methods 500, 600, and/or 700.

| Parameter | Range |
| --- | --- |
| Syringe Pump(s) 1 Rate | 0.1 mL/h-5 mL/hr |
| Syringe Pump(s) 2 Rate | 0.1 mL/h-5 mL/hr |
| Syringe Pump(s) 3 Rate | 0.1 mL/h-5 mL/hr |
| Length of Needle Tip(s) 1 | 1 cm-10 cm |
| Distance from First Needle | 5 cm-30 cm |
| Distance from Second Needle | 5 cm-30 cm |
| Voltage Bias | 5 kV-60 kV |
| Collection Surface Speed | 0.1 m/min-60 m/min |
| Number of concentric needles | 2-5 |
| Needle Radius 1 | 0.108 mm-3.810 mm |
| Needle Radius 2 | 0.0826 mm-3.429 mm |
| Air Temperature | 15° C.-40° C. |
| Air Relative Humidity | 5%-100% |
| Environmental gas | Air, $N_2$, Argon |
| Solvent types | Water, alcohols, dimethylformamide, dimethylacetamide, tetrahydrofuran, acetone, ketones, fluorinated solvents. |

Principles of the present disclosure may be set forth in the following example sets, each of which are presented by way of explanation and not of limitation.

EXAMPLE SET A

Example 1: A structured unit, comprising: an inner core; and an outer shell, wherein the inner core has a first radius, wherein the inner core comprises a plurality of catalyst particles coupled to a plurality of carbon-containing support particles and comprises an ionomer at a first concentration, wherein the outer shell substantially surrounds the inner core from the first radius to a second radius greater than the first radius, and wherein the outer shell comprises the ionomer at a second concentration greater than the first concentration.

Example 2: the structured unit of Example 1, wherein the structured unit comprises an overall ionomer to carbon ratio ("I/C ratio") of between 0.5 and 2. Example 3: the structured unit of any of Examples 1-2, wherein the inner core comprises a first I/C ratio, wherein the outer shell comprises a second I/C ratio, and wherein the second I/C ratio is higher than the first I/C ratio. Example 4: the structured unit of any of Examples 1-3, wherein the structured unit is spherical, and wherein a function representing the I/C ratio at a series of points that traverse between the center of the sphere and the outer edge of the sphere has an inflection point at the boundary between the inner core and the outer shell.

Example 5: the structured unit of Example 4, wherein the function is a sigmoid function. Example 6: the structured unit of Example 4, wherein the function approximates a step function. Example 7: the structured unit of any of Examples 1-6, wherein the outer shell has a constant thickness. Example 8: the structured unit of any of Examples 1-6, wherein the outer shell has a variable thickness. Example 9: the structured unit of any of Examples 1-8, wherein the outer shell comprises an ionomer not present in the inner core. Example 10: the structured unit of any of Examples 1-9, wherein the inner core further comprises a plurality of support particles, each support particle having a plurality of catalyst particles adhered thereto.

In this disclosure, reference has been made to the accompanying drawings, which form a part hereof, and in which is shown by way of illustration specific embodiments in which the disclosure may be practiced. It is understood that other embodiments may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate embodiments may be used in any combination desired to form additional hybrid embodiments of the disclosure.

Further, although specific embodiments of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents. Also, as used herein, the terms "coupled," "coupling," or any other variation thereof, are intended to cover a physical connection, an electrical connection, a magnetic connection, an optical connection, a communicative connection, a functional connection, a thermal connection, a chemical connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An electrode, comprising:
at least one layer of structured units adhered to a surface of a substrate, each of the structured units comprising a spherical outer shell and a spherical inner core,
wherein the inner core has a first radius,
wherein the inner core comprises a plurality of catalyst particles coupled to a plurality of carbon-containing support particles and comprises an ionomer at a first concentration,
wherein the outer shell substantially surrounds the inner core from the first radius to a second radius greater than the first radius,
wherein the outer shell comprises the ionomer at a second concentration greater than the first concentration,
wherein the outer shell and the inner core are concentric, and
wherein each of the structured units comprises an overall ratio of ionomer to carbon of between 0.5 and 2.

2. The electrode of claim 1, wherein a first ratio of ionomer to carbon at the first radius of at least one of the structured units is between 0.1 and 0.9, and a second ratio of ionomer to carbon at the second radius of the at least one of the structured units is between 0.9 and 5.

3. The electrode of claim 1, wherein an ionomer relative concentration profile is defined as a ratio of ionomer to carbon at a radius of a structured unit, and wherein the ionomer relative concentration profile has an inflection point at the first radius.

4. The electrode of claim 3, wherein the ionomer relative concentration profile is a sigmoid function.

5. The electrode of claim 4, wherein the sigmoid function has (i) a minimum value at the center of the structured unit, (ii) a maximum value at the second radius, and (iii) a tangent line at the inflection point which has a slope greater than 1.

6. The electrode of claim 1, wherein the ionomer comprises at least one of perfluorosulfonic acid (PFSA), perfluoro imide acids (PFIA), a quaternary polyphenylene oxide (QPPO), or a hydrocarbon-based ionomer.

7. The electrode of claim 1, wherein the inner core further comprises a plurality of cerium oxide nanoparticles.

8. The electrode of claim 1, wherein the plurality of support particles are configured with an average size greater than an average size of the plurality of catalyst particles.

9. The electrode of claim 8, wherein the plurality of catalyst particles are configured with a size between 1 nanometer (nm) and 10 nm in the longest dimension, and wherein the plurality of support particles are configured with a size between 30 nm and 200 nm in the longest dimension.

10. The electrode of claim 1, wherein each support particle of the plurality of support particles is adhered to at least 10 catalyst particles of the plurality of catalyst particles.

11. The electrode of claim 1, wherein the plurality of carbon-containing support particles comprises at least one of a carbon black, a carbon nanotube, diamond, graphite, graphene, silicon carbide, titanium dioxide, iridium oxide, tungsten oxide, tin oxide, niobium oxide, or tungsten carbide.

12. The electrode of claim 1, wherein the at least one layer of structured units comprises:
a first layer of structured units adhered to the surface of the substrate; and
a second layer of structured units disposed atop the first layer of structured units,
wherein the structured units comprising the first layer are configured with a first outer radius, and wherein the structured units comprising the second layer are configured with a second outer radius larger than the first outer radius.

13. The electrode of claim 12, wherein the at least one layer of structured units further comprises:
a third layer of structured units disposed atop the second layer of structured units,
wherein the structured units comprising the third layer are configured with a third outer radius larger than the second outer radius.

14. The electrode of claim 1, wherein the first radius is between 25 nm and 1500 nm, and wherein the second radius is between 35 nm and 1600 nm.

15. The electrode of claim 1, wherein each structured unit comprises an additive in a concentration of between 0.01% and 10% by mass, and wherein the additive comprises at least one of a hydrophobic polymer, a radical scavenging compound, a radical scavenging ion, or a hydrophobic powder.

16. The electrode of claim 1, wherein the structured units are formed via an electrospraying process.

* * * * *